United States Patent [19]

Mauz

[11] 4,388,083

[45] Jun. 14, 1983

[54] MIXING BLOCK FOR EXPLOSIVE GAS MIXTURES DETONATED IN A COMBUSTION CHAMBER

[76] Inventor: Wolfgang Mauz, Unterer Kasparswald 6, D-7022 Leinfelden-Echterdingen 3, Fed. Rep. of Germany

[21] Appl. No.: 307,119

[22] Filed: Sep. 30, 1981

[30] Foreign Application Priority Data

Oct. 31, 1980 [DE]  Fed. Rep. of Germany ....... 3041059

[51] Int. Cl.$^3$ ............................................ F02M 21/02
[52] U.S. Cl. ................................ 48/180 R; 48/180 C; 48/192; 137/512; 137/896
[58] Field of Search ................ 48/180 R, 192, 180 M, 48/180 C; 137/896, 512; 148/9.5

[56] References Cited

U.S. PATENT DOCUMENTS

| | | | |
|---|---|---|---|
| 804,002 | 11/1905 | Fouche | 48/192 |
| 1,510,836 | 10/1924 | Dumarois | 48/180 C |
| 3,554,714 | 1/1971 | Johnson | 48/180 |
| 4,019,476 | 4/1977 | Ackley | 48/180 R |

Primary Examiner—Peter F. Kratz

Attorney, Agent, or Firm—Frishauf, Holtz, Goodman & Woodward

[57] ABSTRACT

A mixing block, for attachment to a combustion chamber in which a solid body or material is briefly subjected to high temperature and pressure by the detonation of an explosive gas mixture, is composed of three block-like parts clamped together by screws. This enables the relatively long channels subject to explosion stresses to be constituted of lengthwise bores in the middle block connected by milled short cross-connections. The protective cutoff valve is an automobile type valve set in the upper block piece, which can also have an insert of temperature resistant material adjacent to the mixing chamber portion of the middle block. The ignition device is not shown in the drawing, but is usually provided in the mixing block structure. In the section of the mixing block illustrated in the drawing only one of the gas connections to the mixing chamber (19) is shown. However, similar gas connections and channels are provided for other components to be led to mixing chamber (19) for mixing therewithin; the single drawing section depicting how each of the separate gas connections and channels leading to chamber (19) would be constructed, but only showing one for simplification.

7 Claims, 1 Drawing Figure

U.S. Patent  Jun. 14, 1983  4,388,083
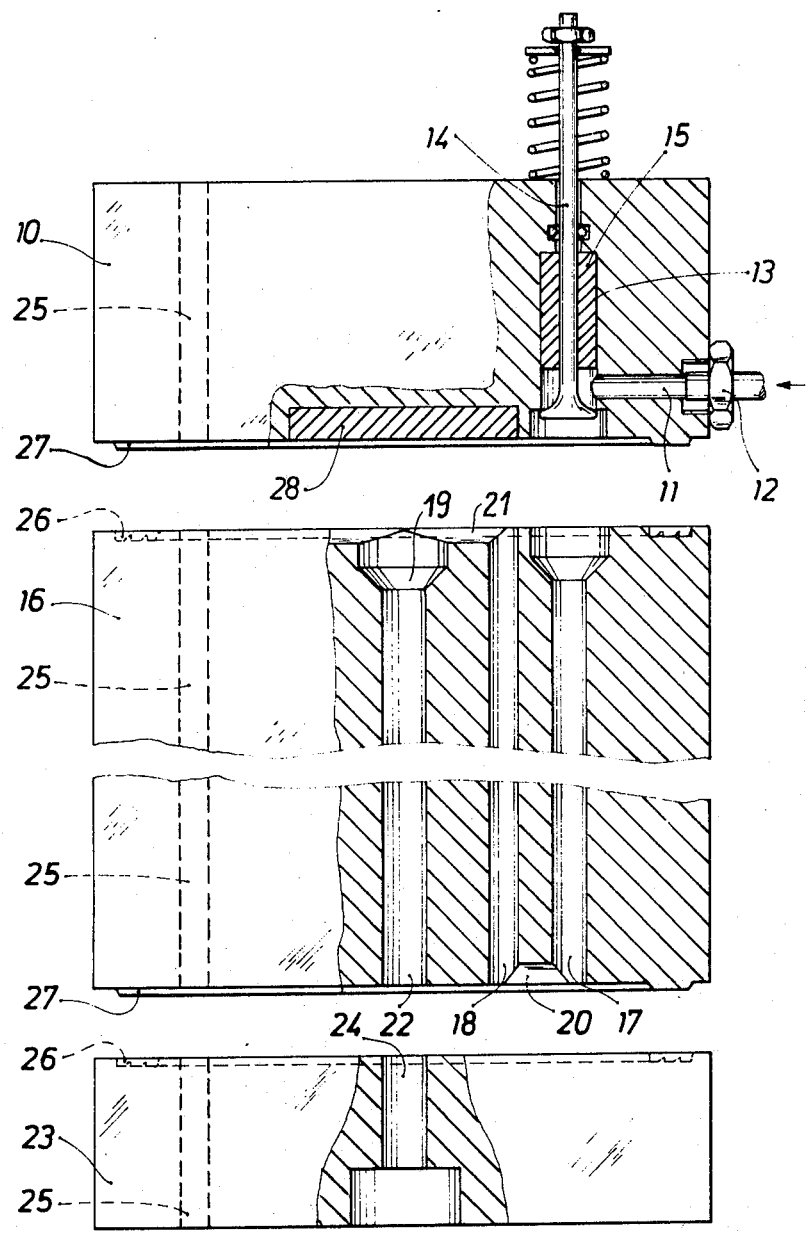

MIXING BLOCK FOR EXPLOSIVE GAS MIXTURES DETONATED IN A COMBUSTION CHAMBER

This invention concerns a mixing block for mixing the components of an explosive gas mixture furnished under pressure, usually in measured quantities, to a combustion chamber where an explosion is produced to treat solid articles therein.

In thermodeburring the exposed surfaces of an article are briefly exposed to oxidation at intense temperature and pressure. The necessary heat and pressure shock is produced by combustion of a mixture of fuel gas and oxygen, with hydrogen, natural gas or methane being particularly useful as a fuel gas in such cases.

In order to be able to release the necessary amount of energy, the gas mixture must be compressed before ignition. This is usually produced by dosing cylinders and gas input compression cylinders. The mixing and ignition of the fuel-oxygen mixture usually takes place in a separate mixing block.

Known mixing devices consist of a one-piece casing in which the mixing chamber and the ignition device are located. These mixing chambers are connected with the gas supply connections of the mixing block by relatively long channels (gas supply bores). Valves are interposed in these channels in order to be able to interrupt the gas supply. The long gas supply bores serve to protect the valves from the effect of ignition of the greatly compressed gases. Known mixing blocks have the disadvantage that they are constructed by the provision of many cross-bores of different diameter in a solid block, thus involving highly complicated construction and a high level of manufacturing expense. The longitudinal and cross-bores in the mixing block must afterwards be in part closed again, so that the gas can be directed in a particular way from one bore to the next. Furthermore, cutoff valves and connections for supply lines can be inserted in the mixing block only from the exterior.

SUMMARY OF THE INVENTION

It is an object of the present invention to provide a mixing block for gas mixtures detonated in a combustion chamber which will be not only less expensive in manufacture, but also will allow insertion of more reliable and inexpensive cutoff valves.

Briefly, the mixing block is made in two or more parts so as to permit cross channels connecting lengthwise bores to be produced by milling while also enabling the provision of replaceable inserts of materials designed particularly to take up the erosion produced by hot exploding gases. This construction also makes possible the use of mushroom-type poppet valves such as are used in automobiles and effectively block explosive forces from intake ducts.

The mixing block of the invention has the advantage that inspection and maintenance of the block during its service life is greatly simplified, in addition to the lower cost of manufacture. Bores through the block are provided only where they are really necessary and channels which do not need to be prolonged to the exterior of the mixing block are not made by boring at all, and are milled instead. The composite mixing block of the invention can be securely held together as a solid unit by machine screws and it can be mounted as a fixed portion of a deburring machine.

The valves can be set in place from the inside of the composite mixing block and high temperature alloys can be used, just as in automobile practice, so that the gas ducts between mixing chamber and valve no longer need to be as long as in the previous practice, since the valves are less sensitive to heat and pressure than the previously used valves.

The mixing block of the present invention has an extended service life because of the possibility of utilizing inserts of temperature and oxidation resistant materials at a number of places exposed to high temperature oxidation. Because of the composite construction these inserts can be relatively small and the expense of their replacement as they are successively worn out can be kept small.

The mixing block of the present invention is of course not limited to utilization in thermal deburring machines, since explosive high temperature and pressure treatment of solids in a confined chamber has already found a wide range of applications, such as the reticulation of foam materials described in German Pat. No. 1,504,096 and the separation of connected porous bodies described in German Pat. No. 2,322,760. The significant nature of all these applications is the treatment of a solid body or material by means of a gas mixture explosion in a closed chamber.

BRIEF DESCRIPTION OF THE DRAWING

The invention is further described by way of illustrative example with reference to the annexed drawings, the single FIGURE of which is a schematic diagram, partly in section, of a mixing block according to the invention composed of three parts.

DESCRIPTION OF THE ILLUSTRATED EMBODIMENT

Each of the three parts of the mixing block device illustrated in the drawing is a rectangular block, the central one being the biggest and having only its upper and lower end shown in the drawing, while the upper and lower blocks form top and bottom caps. The upper block 10 contains a gas connection bore 11 for each of the gas components to be mixed in the device. If the gas mixture to be provided is simply a mixture of oxygen and of a fuel gas, there are accordingly two gas connection bores 11 provided. The sectioning plane in the drawing is selected to pass through the axes of one of these. The connection of a gas supply line to the block 10 is provided by the conventional threaded nipple connection 12.

A bore 13 is provided in the block 10 for insertion of the cutoff valve and is directed at right angles to the connection bore 11. The bore 13 for the valve 14 is of the conventional type, which is to say similar to those provided in an automobile engine cylinder head. A valve guide sleeve 15 serves for accurate adjustment of the valve 14. The valve disk of the valve 14 faces down towards the middle block 16 of the mixing block, so that between the valve disk and the block 10 a wear-resistant valve-seat of conventional construction is provided as shown.

The middle block 16 of the composite mixing block contains all of the shock-absorbing gas bores, namely the long gas duct bores 17 and 18 between valve seat 14 (in block 10) and mixing chamber 19. These long ducts 17 and 18 which are provided for each component of the explosive mixture serve for protection of the valves against burning and contamination by the explosion. In manufacture the middle block 16 is twice bored through in the longitudinal direction to provide each pair of ducts 17 and 18. The gas supply duct constituted by the bores 17 and 18 leads into a mixing chamber 19, the widest part of which is shown in the neighborhood of the top of the block 16 and which also continues downward into the block 16 as a central lengthwise bore 22. In the region of the mixing chamber 19 and the bore 22 the mixing block is exposed to particularly intense burning effects resulting from the back-striking flame front. Hence in the adjacent portion of the upper block 10 an insert 28 made of a material resistant to temperature and oxidation is provided.

The parallel running bores 17, 18, and 22 are connected together at the surfaces of the block 16 by milled channels 20 and 21. Additional cross-bores, which would have to be closed off again at the exterior of the block, are thus quite unnecessary in the construction of the mixing block of the present invention.

The drawing shows the ducts 17 and 18 for only one of the gas mixture components and it is to be understood that the block 16 is provided with a similar set of channels for the other component of the mixture that likewise lead into the mixing chamber 19.

As already mentioned, the gas mixture delivery bore 22 is a prolongation of the wider portion of the mixing chamber 19 and runs lengthwise down the middle of the block 16. An ignition device such as a sparkplug for igniting the explosive mixture can be located suitably anywhere in the widened mixing chamber 19 or in the bore 22 and for that reason, it is not specifically shown in the drawing.

The mixing block shown in the drawing also has a third block 23 of the form of an end-plate or flange, which contains the gas bore 24 leading to the combustion chamber in which the article or material to be treated is located and also contains connection or mounting means for holding the mixing block and the combustion chamber together. In the illustrated case, the block 23 serves particularly to make possible the milling of the cross-channel 20 between the longitudinal bores 17 and 18 of the middle block 16. If this cross connection 20 should be provided as a bore, the block 23 as a separate block could be omitted. In such a case the mechanical connections between the combustion chamber and the mixing block are provided for directly holding the block 16 onto the combustion chamber.

The blocks 10, 16, and 23 have aligned bores 25 through which screws can be provided for passing through the entire structure and holding the three component blocks firmly and precisely together. A suitable seal between the block 10 and block 16, and between the block 16, and the block 23 can be provided by conventional sealing methods for such stressed parts. For this purpose the mixing block rectangular members can be provided with annular seal-grooves 26 for the insertion of metallic sealed members not further shown in the drawing. The facing side of the separation surface of the composite casing has a fitting projection 27 that presses on the metallic seal and plastically deforms it. It is also possible, however, to utilize seals after the fashion of motor vehicle cylinder head gaskets.

Thus, although the invention has been described with reference to a particular illustrative example, it will be understood that modifications and variations are possible within the inventive concept.

I claim:

1. A mixing block structure for mixing components of an explosive gas mixture as they are delivered to an adjacent combustion chamber for confined explosion treatment of a solid object or material located therein, comprising a plurality of block-like bodies including:
   a principal block body having opposite end surfaces and in which are provided
   a first longitudinal bore extending from one to the other of said end surface, at least a part of which is a mixing chamber and which is disposed so as to lead mixed gas from said mixing chamber to said combustion chamber,
   duct means for leading at least two components of said mixture separately to said mixing chamber, said duct means including a pair of longitudinal bores for at least one component gas of said explosive mixture, each bore of said pair extending from one to the other of said end surfaces, and
   cross channels at opposite ends of one member of each of said pair of bores connecting it respectively to the other bore of said pair and to said mixing chamber, each said cross channel which connects with said mixing chamber being channeled in a said end surface of said principal block body and being open along its length at the said end surface, and
   an input-end cap block body shaped to fit against the end surface of the principal block body which is more remote from said combustion chamber and having a gas line connection channel, for connecting an external gas supply line through said cap block to the longitudinal bore of said pair in said principal block body for at least one component gas, which channel is that one of said pair not connected to said mixing chamber by one of said cross channels, said cap block also having a check valve for each said gas line connection interposed therein, and in which input cap block said cross channel which joins with the mixing chamber is channeled in the end surface of said principal body which said input-end cap block fits and is open at said end surface along its length, so as to be closed along its length by said input-end cap block, and wherein in said principal block said duct means includes a said pair of longitudinal bores for each of at least two gaseous components of said explosive mixture and in which said input-end cap block has a said gas line connection channel and a said valve for each said at least two gaseous components of said explosive mixture
   each body of said plurality of bodies also having bores located such that bolts are passed therethrough and thereby said bodies are held in alignment and screwed tightly together.

2. A mixing block structure as defined in claim 1 in which each said check valve in said input-end cap block is set in said cap block with its movable member engaging a valve seat on the side of said valve seat facing the surface of said cap block which is held against said principal block.

3. A mixing block structure as defined in claim 1 in which said longitudinal bores in said principal block are all substantially parallel to each other.

4. A mixing block structure as defined as claim 1 in which said plurality of block like bodies also comprises an output-end cap block fitting the end surface of said principal block body which is nearer said combustion chamber and having a bore therethrough for prolonging said first longitudinal bore of said principal block body, and in which structure said cross channel of said principal block body which joins the bores of said pair of longitudinal bores of said duct means is channeled in said end surface of said principal block body which said output-end cap block fits and is open at said end surface along it length, so as to be closed along its length by said output-end cap block.

5. A mixing block structure as defined in claim 1 or claim 4 in which the joined surfaces at the mutual boundaries of adjacent block-like bodies are shaped for the interposition of gasket seal elements, and in which structure said bores and said bolts therefore are provided passing through said all of said block-like bodies in the longitudinal direction of the mixing block for clamping the block-like bodies together.

6. A mixing block structure as defined in claim 1 in which said gasket seals are metal annular inserts.

7. A mixing block structure as defined in claim 1 in which said mixing chamber adjoins and is open at said end surface of said principal block body which said input-end cap block is shaped to fit and in which said input-end cap block is provided with insert means (28) resistant to high temperature oxidation and embedded in the portion of said cap block adjacent to the said mixing chamber of said principal block body so as to provide a lid for said chamber having high temperature resistance.

* * * * *